No. 690,507. Patented Jan. 7, 1902.
A. E. ZANGENBERG.
FISH TRAP.
(Application filed Sept. 10, 1901.)
(No Model.)
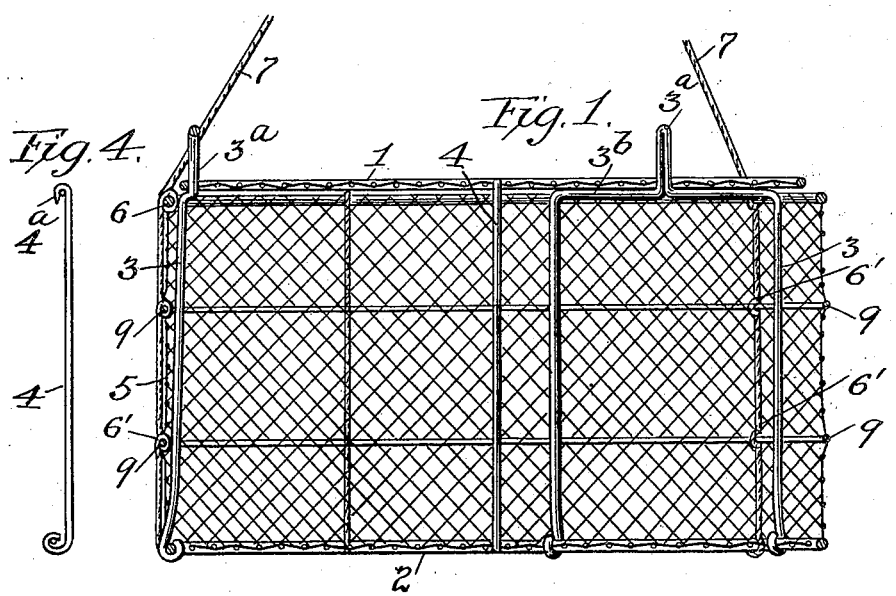
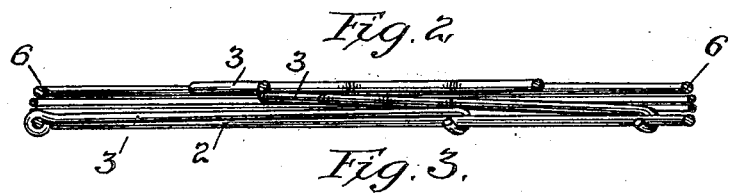
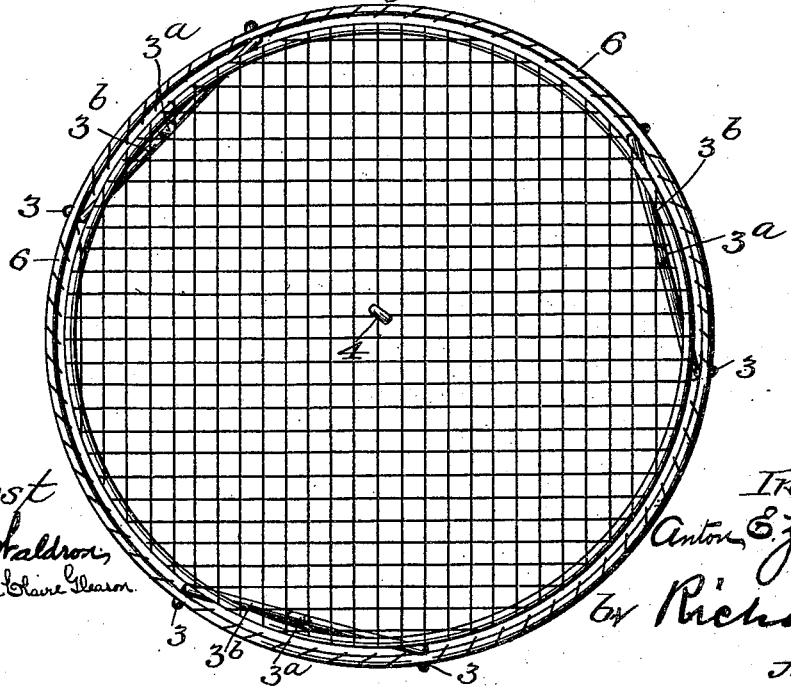
Attest
Isabella Waldron
Adelaide Clare Gleason
Inventor
Anton E. Zangenberg
by Richards & Co.
Att'ys

UNITED STATES PATENT OFFICE.

ANTON E. ZANGENBERG, OF NEW YORK, N. Y., ASSIGNOR TO MORRIS S. NEWCORN, OF NEW YORK, N. Y.

FISH-TRAP.

SPECIFICATION forming part of Letters Patent No. 690,507, dated January 7, 1902.

Application filed September 10, 1901. Serial No. 74,934. (No model.)

*To all whom it may concern:*

Be it known that I, ANTON E. ZANGENBERG, a citizen of the United States, residing in the borough of Bronx, New York city, State of New York, have invented certain new and useful Improvements in Fish-Traps, of which the following is a full, clear, and exact specification.

My invention relates to improvements in fish-traps; and the object of the invention is to produce a simple and economical device which may be easily and efficiently operated and which is not liable to get out of order when in use beneath the water and which may be folded up into compact form when not in use.

The invention comprises a trap having a suitable top and bottom and collapsible sides designed to be dropped down to permit the entrance of the fish to the space between the top and bottom and to be raised to confine the fish in said space.

The invention also includes the details of construction hereinafter described, and particularly pointed out in the claims.

I have illustrated the invention in the accompanying drawings, in which—

Figure 1 is a central vertical sectional view of the trap in distended position to hold the fish. Fig. 2 represents the frame part in collapsed condition. Fig. 3 is a plan view. Fig. 4 is a view of a detail.

The trap has a top 1 and a bottom 2, each of which preferably consists of a metallic ring supporting a netting, which may advantageously be of wire with its edges bent around or otherwise secured to the ring. The top is supported a suitable distance above the bottom by standards 3, which are preferably of substantially inverted-U shape with the lower extremities pivotally connected to the bottom ring, whereby the standards may fold down against the bottom when the trap is not in use. The upper portion of each standard is provided with a projection $3^b$, which passes through the meshes of the netting of the top to hold the top against lateral movement, while the horizontal portions $3^b$ on each side of the projection form an elongated support for the top. In order to prevent the top from being accidentally lifted from these projections, I provide a central rod 4, pivotally connected with the bottom, as by being coiled around one of the wires in the center thereof and having its upper end hooked to engage the wires at the top, as indicated at $4^a$. A netting of flexible material 5 of tubular shape has its lower edge secured to the bottom ring while its upper edge is connected to a loose ring 6, which encircles the standards. This loose ring is of sufficient weight so that when the trap rests upon the sea-bottom the ring will drop down, collapsing the flexible netting and leaving the sides of the trap entirely open, so that fish may have access to the bait, which is secured centrally of the trap. Operating-cords 7 are connected to this ring and pass upward over the edges of the top, where they preferably unite in a single draw-cord. It will thus be seen that when the fish have entered the trap a quick pull by the operator will draw the movable ring 6 upward, causing the flexible netting to completely close the trap, which may then be lifted out of the water with the fish in it. If desired, additional strengthening-rings of metal 9 may be provided, and the draw-cords may be extended down to the bottom ring, engaging the supplemental rings, as shown in the drawings at 6'.

It will be understood that the trap may be of any desired form and constructed of any appropriate material.

Having thus described my invention, what I claim is—

1. A fish-trap comprising a bottom, a top, collapsible standards between said bottom and top and held thereby and a net attached at its lower end to the bottom and movable vertically to inclose the space between the top and bottom, said netting extending continuously about the trap, its vertical plane of movement being adjacent to that of the edges of the top and bottom of the trap, substantially as described.

2. A fish-trap comprising a top and bottom with an open space between, standards pivoted to the edges of the bottom and adapted at their other ends to support the top, a detachable connection between said top and bottom at the center and a collapsible netting encircling said parts with means for operating it, substantially as described.

3. A fish-trap comprising a top and bottom of ring shape, folding standards connecting said top and bottom, a loose ring encircling said standards, a collapsible netting having its edges connected with the ring and to the bottom and draw-cords connected to said loose ring, substantially as described.

4. A fish-trap comprising a top and bottom of circular shape, standards of inverted-U shape having their lower ends pivotally connected to the edges of the bottom and having projections on their upper portions for engaging the meshes of the top, a center rod having its lower end pivotally connected with the bottom and having a hooked upper end detachably engaging the top, a loose ring encircling the standards, a collapsible netting connecting the loose ring with the edge of the bottom and draw-cords connected to said ring, substantially as described.

In witness whereof I have hereunto set my hand in presence of two witnesses.

ANTON E. ZANGENBERG.

Witnesses:
  JOSEPH STEINER,
  MOSES WISEMAN.